United States Patent [19]

Malphrus

[11] Patent Number: 4,516,350
[45] Date of Patent: May 14, 1985

[54] FISHING LURE

[76] Inventor: Manley L. Malphrus, 2130 Brooks Dr., #809, Forestville, Md. 20747

[21] Appl. No.: 514,794

[22] Filed: Jul. 18, 1983

[51] Int. Cl.³ .............................................. A01K 85/01
[52] U.S. Cl. .................................... 43/17.6; 43/42.35; 43/57.1
[58] Field of Search .................. 43/17.5, 17.6, 41, 42, 43/42.08, 42.22, 42.35, 42.36, 42.09, 57.1

[56] References Cited

U.S. PATENT DOCUMENTS

| | | | |
|---|---|---|---|
| 2,197,372 | 4/1940 | Bailey | 43/49 |
| 2,500,477 | 3/1950 | Walker | 43/42.41 |
| 2,536,408 | 2/1951 | Addicks | 43/17.5 |
| 2,558,397 | 6/1951 | Toner, Jr. | 43/42.1 |
| 2,590,558 | 3/1952 | Mickelson | 43/44.83 |
| 2,625,767 | 1/1953 | Pokras | 43/42.05 |
| 2,781,604 | 2/1957 | Brown | 43/42.28 |
| 2,931,125 | 4/1960 | Planin | 43/53.5 |
| 2,983,065 | 5/1961 | Ferguson | 43/42.22 |
| 2,994,983 | 8/1961 | Best | 43/42.09 |
| 3,025,628 | 3/1962 | Murawaki | 43/35 |
| 3,308,569 | 3/1967 | Foellner et al. | 43/17.6 |
| 3,561,151 | 2/1971 | NeHoda | 43/41 |
| 3,824,731 | 7/1974 | Sandschaper | 43/17.5 |
| 3,828,177 | 8/1974 | Day | 43/17.6 |
| 3,861,072 | 1/1975 | Holcombe | 43/17.6 |
| 3,921,328 | 11/1975 | Holcombe | 43/17.6 |
| 4,250,651 | 2/1981 | Ramme | 43/17.6 |

FOREIGN PATENT DOCUMENTS 759073 10/1980 U.S.S.R. ............... 43/17.6

Primary Examiner—Nicholas P. Godici
Assistant Examiner—C. McKee
Attorney, Agent, or Firm—Lowe King Price & Becker

[57] ABSTRACT

A fishing lure includes first and second hollow cylindrical tubes that coaxially interfit to define a watertight compartment. Each tube has an oblique end wall and an opposite, open end. A pair of aligned holes formed in walls of each tube align to receive a fishing hook that interlocks the tubes. A flashing bulb powered by a battery in the watertight compartment simulates phosphorescence. The lure can be easily disassembled by removing the hook. The second tube may be reversed and interfitted with the first tube with the oblique end walls of the tubes establishing a storage case for the hook and other fishing paraphernalia.

12 Claims, 5 Drawing Figures

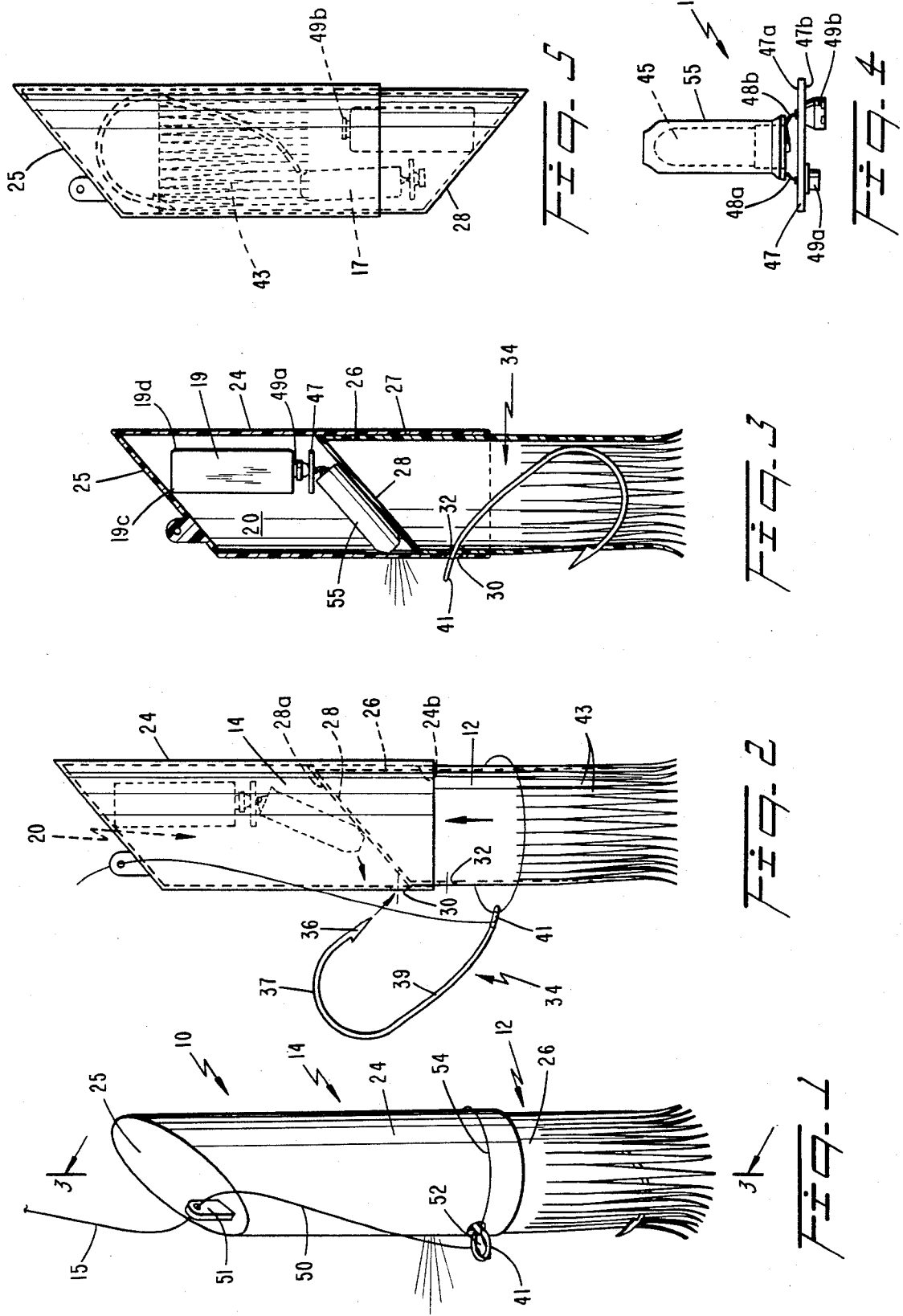

FISHING LURE

TECHNICAL FIELD

This invention generally relates to fishing lures and, more particularly, to fishing lures having a watertight compartment containing a battery powered light source that simulates phosphorescence.

BACKGROUND ART

Fishing lures are frequently used by fishermen to simulate different types of natural bait. Such lures are typically made from metal or plastic forming a lure body carrying one or more exposed hooks. When used under poor light conditions (e.g., at night, during overcast weather, turbid water after heavy rains), these lures are sometimes not seen by fish.

To overcome the above problem, fishing lures incorporating a light emitting source powered by a battery are known, such as the type disclosed in U.S. Pat. No. 3,308,569 to Foellner et al. However, these lures often contain generally sophisticated flashing circuitry enabling the bulb to blink to simulate phosphorescence, increasing the cost of the lure. Further, to waterproof the bulb and circuitry, prior art lures of which I am aware generally incorporate rather complex and expensive seals.

Another problem associated with prior art fishing lures is that they are generally of a predetermined weight and therefore tend to travel at a constant depth, unless additional fishing line is paid out or the speed of line retrieval is varied (e.g., when trolling from a boat). However, when casting from shore, it is usually impractical for the fisherman to vary the depth of the lure in the aforesaid manner. Thus, depending on temperature, light and weather conditions determining the depth where fish may tend to congregate, prior art lures are often ineffective.

It is accordingly an object of the present invention to provide a fishing lure having a simple and inexpensive sealing means capable of maintaining a battery operated flasher waterproof.

Another object of the invention is to provide a fishing lure having an easily accessible compartment that can be filled with a variable number of weights to easily adjust the fishing depth of the lure.

Another object of the invention is to provide a fishing lure having easily disconnected component parts that can be converted into a storage case for the safe storage of hooks and other fishing paraphernalia.

DISCLOSURE OF INVENTION

A fishing lure, according to the invention, comprises a pair of first and second tubes, each having generally cylindrical side walls enclosed at one end by an end wall and open at an opposite end. The first and second tubes are hollow with each having a diameter enabling the second tube to be coaxially inserted a predetermined distance so that overlapping portions of the side walls are in contact with each other, defining a water tight compartment in a forward interior portion of the first tube between the end walls. A battery powered flasher bulb located within the watertight compartment emits light through the side walls of the second tube and trailing tentacles formed at a rear portion thereof to simulate phosphorescence as the lure moves through the water.

A pair of holes formed respectively in the side walls of the first and second tubes come into alignment when the tubes interfit to receive a hook interlocking the tubes together. The end walls are parallel to each other and forwardly inclined to wedge the battery and flasher bulb tightly into the watertight compartment to maintain a reliable electrical interconnection.

By removing the hook from the aligned holes, the first and second tubes are easily separated and can be inversely interfitted to form a storage case for the hook and other fishing paraphernalia.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its details are capable of modifications and various obvious respects, all without departing from the invention. Accordingly, the drawing and description are to be regarded as illustrative in nature, and not as restrictive.

BRIEF DESCRIPTION OF THE DRAWINGS

FIG. 1 is a perspective view of a fishing lure according to the present invetion;

FIG. 2 is a side elevational view of the fishing lure of FIG. 1 in a partially assembled state;

FIG. 3 is a sectional view taken along line 3—3 of FIG. 1 to illustrate the positioning of a battery/bulb assembly within a watertight compartment formed within the interior of the first tube;

FIG. 4 is a perspective of view of a bulb assembly and connector constructed in accordance with the invention; and FIG. 5 is a perspective view of the fishing lure when the first and second tubes are inversely interfitted to form a storage case.

BEST MODE FOR CARRYING OUT THE INVENTION

Referring to FIG. 1, a fishing lure 10 of the invention generally comprises a pair of interfitted inner and outer hollow cylindrical tubes 12, 14 that can be towed by fishing line 15 to simulate a squid or eel traveling through water. A flashing bulb assembly 17, or "flasher," and a battery 19 located within an interior watertight compartment 20 established within tubes 12, 14 emits light to simulate phosphorescence normally stirred up by squid or eel. Tubes 12, 14, as explained below, can be easily separated, one tube reversed, and the two slip fitted together to house assembly 17, battery 19 and a hook 34.

Outer cylindrical tube 14 includes side walls 24 and an oblique end wall 25. An opposite end of the tube 14 is open to receive inner tube 12. Inner tube 12 also includes a side wall 26 and an oblique end wall 28. Tubes 12, 14 are formed from a slightly resilient, smooth material, such as plastic. The outer diameter of the side wall 26 is slightly less than the inner diameter of side walls 24 so that the inner tube slides easily into the outer tube to define an annular seal at area 27. Thus, as inner tube 12 is inserted into outer tube 14 by first passing oblique end wall 28 through rear open end 24b, as shown in FIG. 2, a water tight compartment 20 is formed in the forward, interior portion of the outer tube between the end walls.

A pair of holes 30, 32 are formed respectively in sidewalls 24, 26 to mount a hook 34 to fishing lure 10. As illustrated in FIG. 3, holes 30, 32 become aligned when tube 12 is inserted a predetermined distance into tube 14. Hook 34 is then affixed to lure 10 by first passing barbed point 36 through holes 30, 32 into the interior of inner tube 12 (behind rear end wall 28) followed by bent portion 37 and shank 39 until hook eyelet 41 (of a wider diameter than that of the holes) projects slightly below the outer tube. In this assembly, barbed point 36 projects slightly below tentacles 43 (each tentacle being rearwardly tapered and formed by a pair of triangular cutouts in the trailing portion of side walls 26). Bent portion 37 and shank 39 are substantially concealed within the interior of tube 12 and by the tentacles so that lure 10 simulates a squid or eel.

It will be appreciated that when hook mounting holes 30, 32 are aligned to receive hook 34 in the aforesaid manner, tubes 12, 14 become interlocked and virtually inseparable during use, thereby protecting the integrity of seal area 27 to prevent flooding of compartment 20. Holes 30, 32 are further located on side walls 24, 26 respectively so that oblique end walls 25, 28 are generally parallel to each other and properly spaced to receive bulb assembly 17 and battery 19.

Bulb assembly 17 includes a common flashlight bulb 45 of a type having a built-in heat responsive flasher that is connected by a pair of short wires 48a and 48b to a small, rigid, mounting plate 47 having opposite parallel surfaces 47a and 47b. Each wire 48a and 48b, as illustrated in FIG. 4, passes through separate apertures formed in plate 47 (made of an electrical insulator) and are soldered to a pair of longitudinally spaced terminals 49a and 49b affixed to flat surface 47b. Wires 48a, 48b are sufficiently rigid to support bulb 45 in a fixed position projecting above surface 47a, yet allow the bulb to smoothly pivot into various inclined positions with respect to surface 47a. This enables the bulb to be properly positioned within compartment 20, as discussed below.

Battery 19 is preferably a commercially available 9 volt battery having terminals 19a and 19b that snap fit to terminals 49a, 49b respectively to power bulb 45.

Assembly of lure 10 is easy. Prior to interfitting tubes 12,14 in the manner described above, battery 19 connected to bulb assembly 17 is dropped into the outer tube so that a bottom edge 19c of the battery rests on an inner inclined surface of end wall 25 while battery side edges 19d contact inner surfaces of side wall 24. As inner tube 12 is then inserted into tube 14, a leading edge 28a of oblique end wall 28 contacts bulb 45. Further insertion of inner tube 12 causes the bulb to pivot and be guided into the bottom of compartment 20 by the inclined forward surface of end wall 28 acting as a cam surface (FIG. 2). As holes 30, 32 align (permitting attachment of hook 34), both battery 19 and bulb 45 become tightly wedged into forward upper and lower rear portions of compartment 20 by oblique end walls 25, 28 preventing electrical disconnection as might otherwise occur during repetitive casting and retrieval of fishing lure 10.

Lure 10 is preferably connected to fishing line 15 by a leader 50. As illustrated in FIG. 1, leader 50 is tied at one end 52 to hook eyelet 41 and then looped once around outer tube 14 to define a loop 54 completely encircling part of seal area 27. Leader 50 is then rethreaded through hook eyelet 41 and passes forwardly through a tab 51 for connection to line 15. When tension is applied to leader 50 through line 15 during fishing, loop 54 advantageously tightens against outer tube 14 to reinforce seal area 27. This arrangement also urges hook eyelet 41 upwardly against tube 14 causing the hook to remain fully extended so that the barbed point 36 projects downward through tentacles 43 at all times.

Inner tube 12 is preferably translucent so that light emitted by bulb 45 illuminates and 'sparkles' on tentacles 43. For greater underwater visibility to attract fish, side walls 26 and tentacles 43 are preferably tinted blue. Also, a preferably black, open ended, rubber cylindrical sleeve 55 is fitted around bulb 45 so that light is concentrated and emitted only through the top of the bulb (to shine through end wall 28 and illuminate the tentacles) for improved simulation of phosphorescence and to better conceal the hook.

Since end wall 25 is upwardly inclined and tab 51 projects forward from a lower portion of end wall 25, battery 19 and wires 48a, 48b tend to be located in an upper part of compartment 20. Thus, should slight leakage of water into compartment 20 through seal area 27 occur, frequent retrieval of lure 10 during csting would allow the fisherman to detect the leakage (by viewing through side walls 26) before the water level in compartment 20 reaches the battery. Thus, short circuiting can be prevented. Sleeve 55 also assists in protecting wires 48a, 48b connected to bulb 45.

After fishing, tubes 12, 14 are easily pulled apart by disengaging hook 34 from holes 30, 32. Thereafter, hook 34 can be dropped into the interior of tube 12. Tube 14 is then reversed and interfitted with tube 12 open end first (see FIG. 5), so that oblique end walls 25, 28 now define opposite ends of lure 10 converted into a storage case housing the bulb and battery arrangement as well as hook 34 and other fishing paraphernalia, if desired. In this manner, lure 10 can be safely stored in a tackle box or pocket of a fishing vest (not shown) and can be rapidly reassembled when used again as described above.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein. For example, compartment 20 can be used to house small weights causing lure 10 to sink to a desired depth. Furthermore, it can be appreciated that the outer configuration of tubes 12, 14 can be modified to provide the appearance of an eel, various types of bait fish or the like without departing from the scope of the invention so long as sealing area 27, holes 30, 32 and compartment 20 are present in such other embodiments.

I claim:

1. A fishing lure, comprising:
   (a) a pair of first and second tubes, each having a generally cylindrical side wall enclosed at one end by an end wall and open at an opposite end, said cylindrical side walls having diameters enabling the second tube to be coaxially inserted into the first tube said end wall first with overlapping portions of the side walls in sealing, slip fitting contact with each other to define a watertight compartment in a forward interior portion of the first tube between said end walls, said tubes when connected together forming a lure body; and
   (b) means for enabling a hook to be affixed to at least one of said first and second tubes.

2. The fishing lure of claim 1, wherein said hook affixing means includes a pair of holes respectively formed in the first and second tube cylindrical side walls, said holes being aligned when said second tube is inserted into the first tube, said hook passing through the holes for attachment to the lure body and interlocking the first and second tubes together.

3. The fishing lure of claim 2, wherein each end wall is formed oblique with respect to the longitudinal axis of said first and second tubes, said holes being formed in said first and second cylindrical side walls so that the end walls are generally parallel to each other and forwardly inclined when said holes are aligned.

4. The fishing lure of claim 3, further including light emitting means including a flashing bulb powered by a battery means located in the watertight compartment.

5. The fishing lure of claim 4, further including means for coupling the bulb to said battery means, said coupling means including a mounting plate having a pair of terminals affixed to one side of the plate and attachable to corresponding terminals of said battery means, a pair of wires extending through the plate to electrically connect the plate terminals to the bulb, each wire having sufficient rigidity to support the bulb in a position projecting outwardly from a surface of said connecting plate located opposite the surface carrying the plate terminals and being capable of permitting the bulb to pivot about said connecting plate, thereby enabling said battery means to be wedged into a forward upper portion of said watertight compartment and said bulb to extend along the end wall of said second tube at an obtuse angle with respect to the battery means to snugly wedge the battery means and bulb in said compartment.

6. The fishing lure of claim 5, wherein said side walls of said first and second tubes are respectively formed from slightly resilient material and are generally smooth along portions thereof in contact with each other defining said sealing area.

7. The fishing lure of claim 6, further including a tab projecting forwardly from a forward inclined surface of said first tube end wall, said tab including an aperture for receiving fishing line or the like therethrough connected to said hook.

8. The fishing lure of claim 7, further including a wire defining a fishing leader having one end affixed to a fastening eyelet of said hook projecting below the fishing lure through said aligned holes, said leader completely encircling an outer surface of the first tube side walls around said sealing area and being threaded through said eyelet to extend forwardly through the tab for connection to a fishing line, whereby tension applied to said leader through said line while fishing causes the loop to tighten against the first tube reinforcing said sealing area.

9. The fishing lure of claim 8, wherein a rear or trailing portion of said second tube includes a series of longitudinal cuts defining plural longitudinally extending tentacles circumferentially disposed around the trailing portion to provide said fishing lure with a squid-like appearance, said hook extending longitudinally rearwardly through an interior portion of said second tube so that a barbed point of said hook projects slightly below a lowermost portion of said tentacles of said lure.

10. A fishing lure, comprising:
(a) a pair of first and second tubes, each having a generally cylindrical side wall enclosed at one end by an end wall and open at an opposite end, said cylindrical side walls having diameters enabling the second tube to be coaxially inserted into the first tube with overlapping portions of the side walls in sealing contact with each other to define a water-tight compartment in a forward interior portion of the first tube between said end walls, said tubes when connected together forming a lure body; and
(b) means for enabling a hook to be affixed to at least one of said first and second tubes, wherein said hook affixing means includes a pair of holes respectively formed in the first and second tube cylindrical side walls, said holes being aligned when said second tube is inserted into the first tube, said hook passing through the holes for attachment to the lure body and interlocking the first and second tubes together, wherein each end wall is formed oblique with respect to the longitudinal axis of said first and second tubes, said holes being formed in said first and second cylindrical side walls so that the end walls are generally parallel to each other and forwardly inclined when said holes are aligned.

11. A fishing lure, comprising:
(a) a pair of first and second tubes, each having side wall means enclosed at one end by an end wall and open at an opposite end, said side wall means of each tube being dimensioned to enable the second tube to be coaxially coaxially inserted into the first tube with overlapping portions of the side walls in sealing contact with each other to define, in a first position wherein the end wall of the second tube is inserted first into the first tube a water-tight compartment in a forward interior portion of the first tube between said end walls, said tubes when connected together in the first position forming a lure body, said second tube being further coaxially insertable open end first into the first tube so that said end walls define opposite ends of the first and second tubes when connected together to establish therebetween a storage compartment larger than said water-tight compartment to receive fishing paraphernalia and the like; and
(b) means for enabling a hook to be affixed to at least one of said first and second tubes in said first position.

12. A fishing lure, comprising:
(a) a pair of first and second tubes, each having a generally cylindrical side wall enclosed at one end by an end wall and open at an opposite end, said cylindrical side walls having diameters enabling the second tube to be co-axially inserted into the first tube with overlapping portions of the side walls in sealing, slip fitting contact with each other to define a watertight compartment in a forward interior portion of the first tube between said end walls, said tubes when connected together forming a lure body; and
(b) a fishing hook;
(c) means for enabling the hook to be affixed to at least one of said first and second tubes, said hook affixing means including a pair of holes respectively form in the first and second tube cylindrical side walls, said holes being aligned when said second tube is inserted into the first tube, said hook passing through the holes for attachment to the lure body and interlocking the first and second tubes together.

* * * * *